United States Patent [19]

Maxwell

[11] 4,335,627

[45] Jun. 22, 1982

[54] HYDRAULIC FLYWHEEL

[76] Inventor: Thomas J. Maxwell, 13252 N. 47th Pl., Phoenix, Ariz. 85032

[21] Appl. No.: 79,984

[22] Filed: Sep. 28, 1979

[51] Int. Cl.³ .............................................. G05G 3/00
[52] U.S. Cl. .................................... 74/572; 233/20 R
[58] Field of Search ................ 74/572, 573 R, 573 F, 74/574; 123/192, 192 B; 51/169; 60/221, 222; 233/20 A, 20 R

[56] References Cited

U.S. PATENT DOCUMENTS

| 1,254,694 | 1/1918 | Humphries | 74/572 |
| 1,703,991 | 3/1929 | Day | 74/572 |
| 2,209,960 | 8/1946 | Dashefsky | 74/574 |
| 2,404,515 | 7/1946 | Meyer | 74/572 |
| 3,248,967 | 5/1966 | Lewis | 74/572 |
| 3,360,924 | 1/1968 | Davis | 60/222 |
| 3,747,840 | 7/1973 | Weiland | 233/20 R |

FOREIGN PATENT DOCUMENTS

| 2255766 | 5/1974 | Fed. Rep. of Germany | 233/20 R |
| 2717220 | 11/1978 | Fed. Rep. of Germany | 74/572 |
| 322306 | 12/1929 | United Kingdom | 74/572 |

Primary Examiner—Kenneth Dorner
Attorney, Agent, or Firm—Don J. Flickinger

[57] ABSTRACT

A pair of separable sections forming a hollow structure are coupled to a rotatable shaft. Controlled quantities of hydraulic fluid are introduced into the hollow structure through a passageway within the shaft. One of the sections is selectively slidable along the shaft, for release of fluid from within the structure.

2 Claims, 4 Drawing Figures

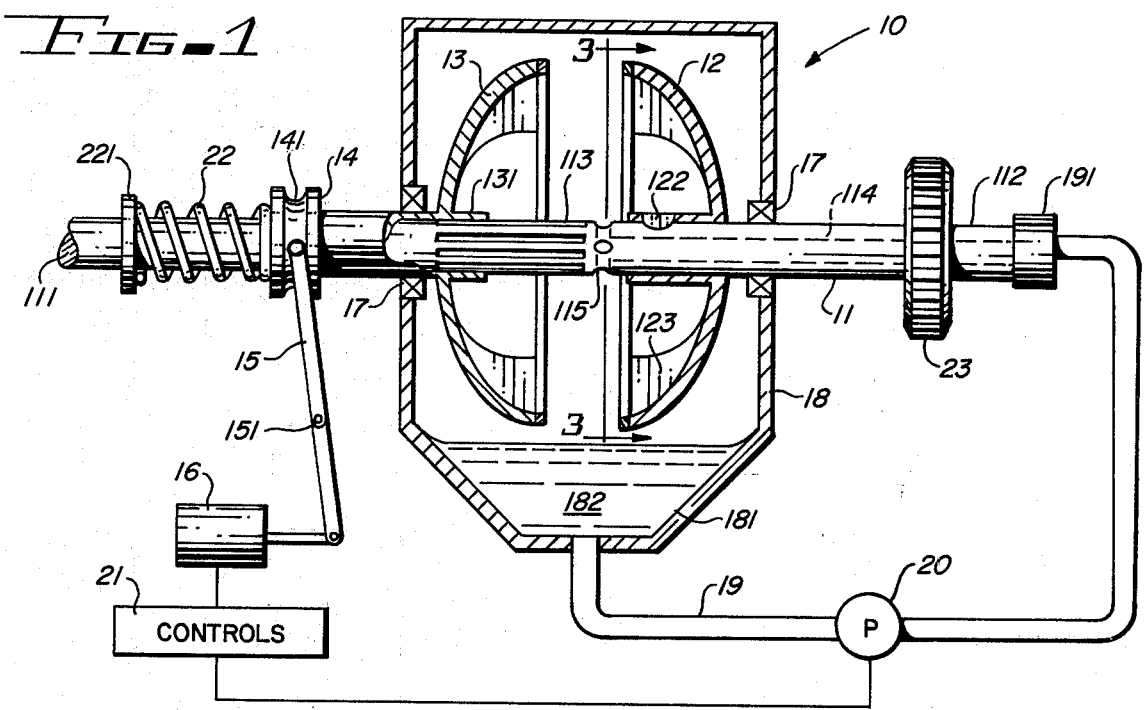
FIG-1
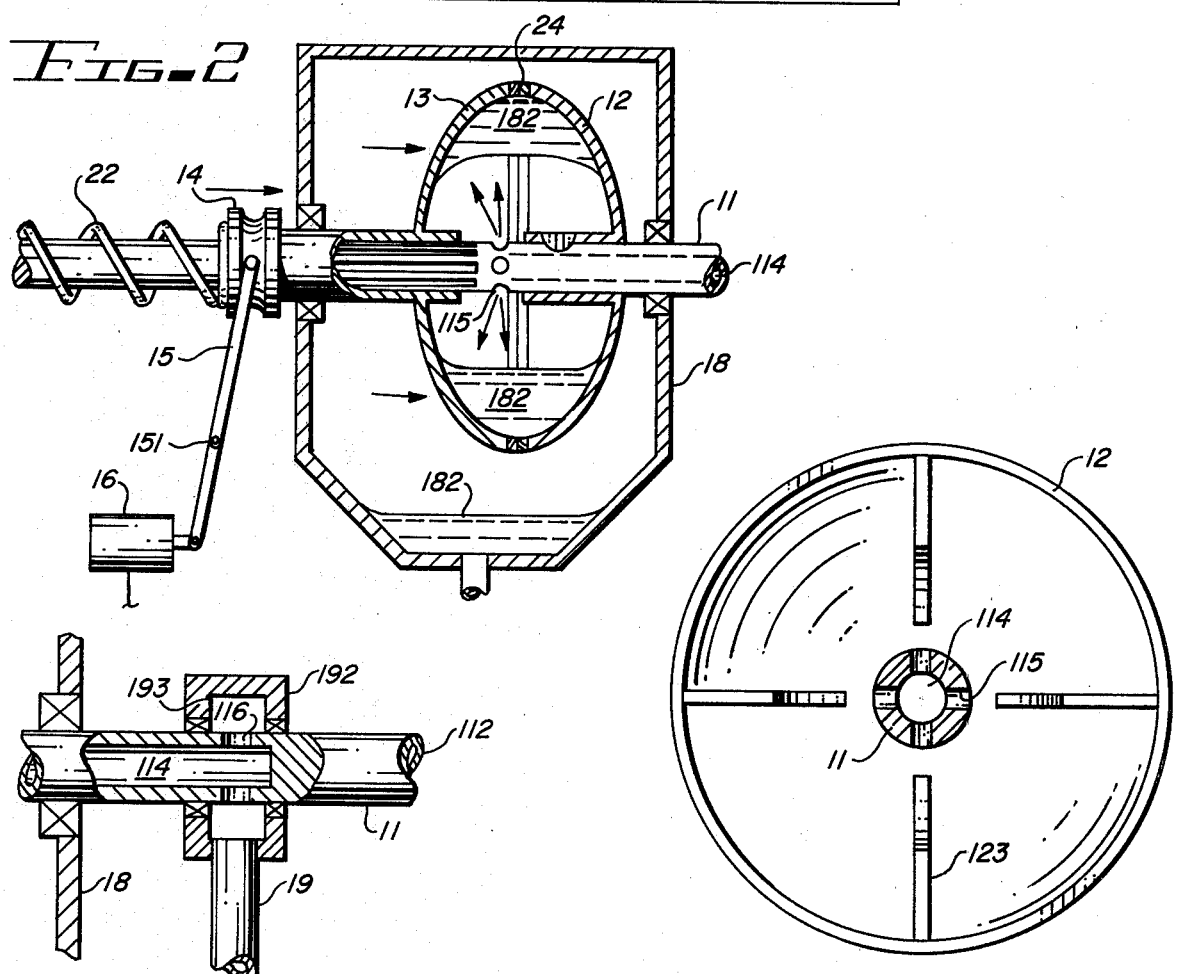
FIG-2
FIG-4
FIG-3

HYDRAULIC FLYWHEEL

BACKGROUND

1. Field of the Invention

The invention relates to the field of variable moment of inertia flywheels and most particularly to that field in which the moment of inertia is varied by hydraulic means.

2. Prior Art

A flywheel is a wheel designed to preserve or store momentum. It is most frequently used with a machine which is called upon to do considerable work but in which the work demand is not constant. Typically the flywheel is made with a heavy rim. As it acquires speed, its inertia assists in maintaining that speed, so that any sudden call for extra power is available immediately, and any tendency of the machine to run away or race, because of a sudden easing of the load, is avoided. In addition to its role of balancing a machine subject to a regular demand, the flywheel overcomes the problem of a dead center usually associated with devices for converting linear to reciprocating motion. At dead center all of the forces act along a radial line through the center of rotation. There is no moment created about the center at that point. The flywheel, with its inertia, carries the linkages through dead center to the point where the external driving force no longer acts through the axis of rotation and provides a moment of inertia about that axis.

The principles of the flywheel comprise inertia and centrifugal force. A rotating body tends to continue its motion and resist any change either of acceleration or retardation. The heavier the body is, and the larger its diameter, and the faster its speed, the more it resists change, because of its inertia. A heavy flywheel when speeded gradually becomes a store of energy. Thus, if there should be a sudden demand for an excess of power, with no apparent change in speed, as when a heavy metal press is placed into operation, the mechanism, with the aid of the flywheel, moves continuously without stopping or jerking. Thus the flywheel tends to equalize the load on the drive mechanism. The four-cycle combustion engine could not be operated at all without a flywheel, as the combustion cycle provides for an explosion only once in every four revolutions of the engine crankshaft.

In an internal combustion engine, a flywheel is located at one end of the crankshaft and serves to store up energy from the power stroke and supply it during the other three strokes. Since there is an overlapping of power strokes in a multicylinder engine, the size or the weight of the flywheel is reduced as the number of cylinders increases. The effect of a very heavy flywheel is to decrease the acceleration of the automobile because of the power that is required to increase the speed of the heavy flywheel. However, if the flywheel is made too light, surges of engine speed may be communicated to the transmission, which would be undesireable. Thus, in automotive design practice, a compromise is made in the determination of the size of the fly-wheel.

The problem of getting a machine up to speed when it is coupled to a heavy flywheel is not peculiar to automotive design. As early as Jan. 29, 1918, a U.S. Pat. No. 1,254,694, was issued to Humphries for a flywheel which, "will offer but slight resistence to rotation of the wheel when starting, but when the engine or mechanism begins to make up its speed . . . weight will move . . . to the rim where (the wheel) . . . will exercise its inertia in maintaining a substantially uniform speed of rotation." Humphries wheel was limited in that it had to be operated in a horizontal plane. He taught the use of a fluid or a pseudofluid (balls) which would move from the hub of the flywheel to its rim as the wheel was brought up to speed. Once the wheel had achieved speed its moment of inertia remained constant, Humphries having provided no means for varying the moment of inertia.

On Dec. 5, 1929, British Pat. No. 322,306 was issued to Thomas, a citizen of France. His flywheel is somewhat reminiscent of that of Humphries in that it was a dish-shaped flywheel which was limited in its operation to a horizontal plane. The dish was empty when its rotation was first started and therefore its moment of inertia was low and the starting couple was strong. As the wheel was brought up to speed, liquid was introduced into the dish-shaped chamber of the wheel and was acted upon by centrifugal force so as to move towards the rim of the dish and yield the rotating device a large moment of inertia. Unlike Humphries, Thomas provided his fluid from an external source and therefore could control the amount of fluid injected into the wheel and thus establish some control over the resultant moment of inertia.

In U.S. Pat. No. 2,404,515 issued to Meyer on July 23, 1946, and in U.S. Pat. No. 3,360,924 issued to Davis on Jan. 2, 1968, flywheels are disclosed which use fluid to obtain their mass. Neither one of them teaches the use of the fluid to provide an easily started, low moment of inertia flywheel. Meyer proposes the use of the hydraulic flywheel to conserve metal that would otherwise be required to achieve the necessary mass and to provide a wheel that could be easily dismantled or separated for purposes of repair or replacement of parts. Davis used fluid in his flywheel device in the hopes that liquid exhaust jets at the periphery of the wheel, which were operative to exhaust the liquid from the wheel when the wheel lost its drive power, would provide necessary reaction force at the exhaust jets to maintain the wheel at a reasonably constant speed of revolution until drive power could be re-initiated.

It is an object of the present invention to provide a flywheel which may be started rapidly because of its initial low moment of inertia and which, having achieved speed, may have its moment of inertia increased to an optimum level as determined by the machinery with which it is used and the nature of the load demand placed upon it.

It is a further object of the invention to provide a flywheel whose moment of inertia may be infinitely, and controllably variable during the course of operation of said flywheel.

It is another objective of the invention to provide a flywheel which may be rotated in any plane while still providing an infinite variability in the moment of inertia of the wheel.

SUMMARY OF THE INVENTION

The hydraulic flywheel is a hollow structure of separable sections. Each section is coupled to a rotating shaft such that when the shaft is driven, the separable sections of the hydraulic flywheel are caused to revolve in response thereto. At least one section of the hollow structure is affixed rigidly to the drive shaft. At least one of said separable sections is slidably coupled to said drive shaft. When the slidable section is brought into contact with the rigidly affixed section the integrity of the hollow structure is such that oil, or other fluid or pseudofluid, may be introduced through an internal fluid passageway through the rotating shaft and out orifices in said shaft into the hollow structure where the fluid is contained. As the fluid is introduced into the hollow structure, centrifugal force causes it to flow to the peripheral regions of the hollow structure. As the fluid accumulates within the hollow structure the moment of inertia of the flywheel increases.

Should it be desired to reduce the moment of inertia of the flywheel, means are provided for exercising the separable section so as to remove it from contact with the rigidly fixed section. Depending upon the degree of noncontact of the sections, a quantity of fluid will be ejected as a result of centrifugal forces. The separable section may then be again exercised to reinstate the integrity of the hollow structure so as to retain the remaining fluid therein. Fluid which is so expelled is collected in a sump which communicates with the internal fluid passageway in the drive shaft by means of a fluid conduit and pumping means. Necessary controls are provided for exercising the separable sections of the hollow structure of the flywheel and for energizing the pumping means.

DESCRIPTION OF THE DRAWINGS

FIG. 1 illustrates an embodiment of the invention showing the flywheel as being comprised of two separable dished sections which may be brought into contact to form a hollow structure capable of holding a fluid medium. The sections are shown in their noncontacting state and the fluid medium is seen to have collected within a retaining sump which communicates to the interior of the hollow structure formed by the separable sections through a fluid conduit, a pump and an internal passageway within the rotating shaft on which the hollow structure is mounted.

FIG. 2 shows the invention in which the separable sections of the hollow structure of the flywheel have been brought into the contacting state and a fluid medium has been transferred from the sump to the interior of the resulting hollow structure.

FIG. 3 illustrates the interior of one of the separable sections of the hollow structure of the flywheel as well as showing a cross-section of the rotating drive shaft illustrating the interior fluid passageway and output orifices. The interior of the separable section is seen to contain several fins which are so placed as to better communicate the inertia of the moving fluid to the hollow structure flywheel as is required to better stabilize the equipment with which the flywheel is utilized under conditions of varying load.

FIG. 4 illustrates a modification of the means by which fluid is injected into the internal fluid passageway of the rotating drive shaft so as to permit in-line coupling to the power output end of said drive shaft.

DETAILED DESCRIPTION OF THE INVENTION

The hydraulic, variable moment of inertia flywheel is illustrated in a presently preferred embodiment in FIG. 1 and ascribed the overall reference 10. A drive shaft 11 is supported by bearings 17 and has a power input end 111 and a power take-off end 112. A dished member 12 is rigidly affixed to shaft 11 by means of a pin or key 122 which rigidly couples dish collar 121 to drive shaft 11.

A second dished member 13 has a collar 131 which is slidably coupled to a spline 113 on shaft 11. Collar 131 extends through dished member 13 and is coupled to grooved collar ring 14. Spring 22 is mounted on shaft 11 between grooved collar 14 and spring stop 221.

The action of spring 22 is to urge grooved collar 14 to the right of the illustration of FIG. 1. This moves dished member 13 into contact with dished member 12 so as to form a hollow structure having two separable sections 12 and 13. FIG. 2 illustrates the result of the action just described.

Grooved collar 14 is provided with a yoke (not shown). Yoke arm 15 has one end coupled to groove 141 of grooved collar 14 and the other coupled to solenoid 16. Operation of solenoid 16 causes yoke arm 15 to pivot about pivot 151 so as to exercise dish member 13 between states of contact and noncontact with dish member 12.

As illustrated in the accompanying Figures, bearings 17 may be supported by the walls of sump housing 18. Sump housing 18 is a closed structure the purpose of which will be made clear in the discussion which follows. Sump housing 18 is provided with a sump 181 which serves to collect and provide a fluid reservoir for fluid 182. Fluid 182 may be a true fluid medium or a pseudofluid medium having flow characteristics analogous to a true fluid. The lower portion of sump 181 communicates via fluid conduit 19 through pump 20 and rotary fluid seal 191 to an interior fluid passageway 114 within rotary shaft 11. Fluid passageway 114 is provided with output orifices 115. When pump 20 is operative, fluid 182 is drawn from sump 181 through fluid conduit 19 and into internal fluid passage 114. From passage 114 fluid 182 is output through orifices 115 from which, when separable dish members 12 and 13 are in their noncontacting states, it returns to sump 181.

When solenoid 16 has been energized so as to exercise yoke arm 15, thereby urging dished member 13 into contact with dished member 12, fluid exiting orifices 115 will be contained within the hollow structure formed when member 13 is in contact with member 12. The contacting surfaces of members 12 and 13 are provided with suitable fluid seals 24 to provide for the fluidtight integrity of the hollow structure. FIG. 2 illustrates the accumulation of fluid 182 within the hollow structure formed when separable sections 12 and 13 are in their contacting state. The centrifugal forces generated by the rapidly rotating shaft 11 causes fluid 182 to move to the peripheral extremes of the hollow structure. The accumulation of fluid, as illustrated in FIG. 2, increases the rim mass of the hollow structure thereby increasing its moment of inertia about the axis of shaft 11.

Should it be desired to decrease the mass of the hydraulic flywheel 10, solenoid 16 may be energized so as to exercise separable dished member 13 into its noncontacting state whereby fluid 182 will be driven by centrifugal forces out of the dished structures 12 and 13 and into sump housing 18 from whence fluid 182 will flow back to sump 181. A rapid exercise of solenoid 16 so as to quickly move dished member 13 from a contacting to a noncontacting and quickly back again to a contacting state will permit only a small portion of fluid 182 to be driven from the hollow structure; the quantity thus expelled being determined by the length of time separable members 12 and 13 were maintained noncontacting. This rapid cycling of solenoid 16 may be used to affect incremental changes in the rim mass and thus the moment of inertia of the hydraulic flywheel.

The interior of both dished members 12 and 13 is provided with fin structures 123. FIG. 3 illustrates the interior of dished member 12 showing a suggested disposition of fin structures 123. Fin structures 123 in dished member 12 in combination with similar finned structures in dished member 13 act to couple the inertia of fluid 182 to members 12 and 13, making the inertia of fluid 182 available in maintaining uniform movement of the hydraulic flywheel.

FIG. 3 also provides a cross-section of drive shaft 11 indicating the central fluid passage 114 and output orifices 115.

In FIG. 1 rotary shaft 11 is provided with a power take-off gear 23. Gear 23 provides the means by which energy may be coupled from rotating shaft 11 to other devices. Gear 23 is provided to illustrate the concept of a power take-off and could as well have been illustrated as a sprocket, a belt pulley, or other means of communicating energy from a rotating shaft.

Should it be desired to end-couple energy directly from shaft 11, rotary fluid seal 192 may be substituted for fluid seal 191 of FIG. 2 (see FIG. 4). Fluid seal 192 is provided with a fluid chamber 193 into which oil is communicated from pump 20 via fluid conduit 19. In this embodiment, the internal fluid passage 114 of shaft 11 is provided with input orifices 116. Fluid exits from chamber 193 into orifices 116 and then travels down internal fluid cylinder 114 to exit from output orifices 115 as previously described.

It should be noted that the hydraulic flywheel system disclosed herein is a reciprocal device and that although rotary shaft-end 111 has been designated as the power input end of shaft 11, this end could well be the power output end of shaft 11 with power input being accepted at shaft end 112. Control means 21 are provided and operatively coupled to solenoid 16 and pump 20 to provide the necessary functioning of these devices as revealed in the foregoing disclosure. Such control devices are well known in the prior art and may be used in combination with various sensing devices, such as means which sense the rotary speed of shaft 11 or the torsional stresses therein, to provide for an automated control system.

The operation of the invention may be summarized as follows:

Shaft 11 is easily driven into rotation because of the lightweight of separable sections 12 and 13 of hydraulic flywheel 10. When shaft 11 has been driven to speed, yoke arm 15 is exercised to urge sliding member 13 into contact with fixed member 12. Alternately, of course, the system could have been started with sections 12 and 13 in their contacting state. Fluid is then pumped from sump 182 into the hollow structure formed when members 12 and 13 are brought into contact. The mass of the fluid accumulating within the hollow structures increases the moment of inertia of the hollow structure as it rotates about the axis of shaft 11. Incremental changes in that rim mass may be made by the rapid alternation of members 12 and 13 between contacting and noncontacting states. The system is a closed system and fluid for use in affecting the rim mass of the hydraulic flywheel is stored and recovered.

Only one of the potential uses of the system will be set forth since those skilled in the art will readily discern areas in which the teachings herein may be utilized. As noted in the background discussion, the choice of the size of an automotive engine flywheel in a multi-cylinder engine is a compromise. If too heavy, acceleration is affected. If too light, engine surges are communicated to the transmission. If the teachings of the present invention were carried into practice in the automotive industry, a hydraulic flywheel, such as herein disclosed, having an initial mass which is the minimum required for smooth engine operation during initial start-up of the automobile could be provided. When the car has reached cruising speed, the separable members of the hydraulic flywheel would then be brought into their contacting state and the resultant hollow structure provided with fluid to increase its rim mass. The amount of fluid provided would be that required to prevent communicating engine speed surges to the transmission. Should it then be necessary for the driver to increase speed of the vehicle by further acceleration, a controlled amount of fluid could be ejected from the hollow structure of the flywheel by bringing the separable members rapidly to a noncontacting state and then back again to their contacting state. This lightened flywheel would permit rapid acceleration. When settling once more into cruising speed, the optimum rim mass for the particular speed of operation could then be provided to the hollow structure of the hydraulic flywheel. A more efficient operation of the automotive power plant would result.

While the invention has been particularly shown and described in reference to the preferred embodiment thereof, it will be understood by those skilled in the art that changes in the form and details may be made without departing from the spirit and scope of the invention. Having described my invention in such thoroughness of detail and clarity of manner in the foregoing discussion and the drawings herein provided that those skilled in the art may easily understand the teachings herein and simply practice them, That which I claim is:

1. A flywheel having a variable moment of inertia comprising:
    a hollow structure of separable sections having internal means for coupling the inertia of a fluid to said hollow structure;
    rotary drive means having fluid conduction means integral thereto;
    means for inputting fluid to and outputting fluid from said fluid conduction means;
    coupling means for coupling said separable sections of said hollow structure to said rotary drive means for rotating said separable section with said rotating drive means;
    means for moving said separable sections between contacting and noncontacting states to effect the integrity of said hollow structure;
    fluid retaining means for retaining fluid output from said fluid conduction means by said output means when said separable sections of said hollow structure are in their contacting state;
    fluid collecting means for collecting fluid originally retained within said hollow structure which fluid is ejected therefrom when said separable sections are moved from their contacting to their noncontacting state; and
    fluid circulating means for conducting fluid from said fluid collecting means to said input means of said fluid conduction means of said rotary drive means.
2. The flywheel of claim 1 further comprising: means for controlling said fluid circulating means.

* * * * *